US012229759B2

United States Patent
Farooq

(10) Patent No.: US 12,229,759 B2
(45) Date of Patent: Feb. 18, 2025

(54) SYSTEMS AND METHODS FOR ONE-CLICK PAYMENTS

(71) Applicant: JPMORGAN CHASE BANK, N.A., New York, NY (US)

(72) Inventor: Umar Farooq, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 145 days.

(21) Appl. No.: 18/052,710

(22) Filed: Nov. 4, 2022

(65) Prior Publication Data

US 2023/0177498 A1    Jun. 8, 2023

Related U.S. Application Data

(60) Provisional application No. 63/264,826, filed on Dec. 2, 2021.

(51) Int. Cl.
G06Q 20/12    (2012.01)
G06Q 20/22    (2012.01)
G06Q 20/38    (2012.01)

(52) U.S. Cl.
CPC ....... *G06Q 20/3825* (2013.01); *G06Q 20/123* (2013.01); *G06Q 20/29* (2013.01)

(58) Field of Classification Search
CPC .. G06Q 20/3825; G06Q 20/123; G06Q 20/29; G06Q 20/38215; G06Q 30/06
See application file for complete search history.

(56) References Cited

U.S. PATENT DOCUMENTS

| | | | | |
|---|---|---|---|---|
| 10,019,711 B1* | 7/2018 | Lerner | .................. | G06Q 20/40 |
| 11,423,135 B1* | 8/2022 | Zhang | .................. | G06F 21/335 |
| 2012/0268466 A1* | 10/2012 | Kolo | .................... | G06T 11/206 |
| | | | | 345/440 |
| 2015/0254655 A1* | 9/2015 | Bondesen | ......... | G06Q 20/3821 |
| | | | | 705/72 |

FOREIGN PATENT DOCUMENTS

JP    2019139547 A    *    8/2019

OTHER PUBLICATIONS

"Assisting with API Design through Reusing Design Knowledge", Mahsa Hasani Sadi, University of Toronto, 2020 (Year: 2020).*

* cited by examiner

*Primary Examiner* — Duan Zhang
(74) *Attorney, Agent, or Firm* — GREENBERG TRAURIG LLP

(57) ABSTRACT

Systems and methods for one-click payments are disclosed. A method may include a backend for a financial institution: receiving, from a user electronic device, enrollment of a user in a payments process; generating a token comprising an identification of an API exposed to the backend; communicating the token to the user electronic device; receiving, from a content provider, enrollment of the content provider in the payments process; receiving, at the API, an identifier for the content provider, a cost for content provided by the content provider, and the user identifier; transferring the cost from the user account to the content provider account; and notifying the content provider of completion of the transfer, wherein the content provider is configured to make the content available to the user electronic device after completion of the transfer.

17 Claims, 5 Drawing Sheets

SYSTEMS AND METHODS FOR ONE-CLICK PAYMENTS

RELATED APPLICATIONS

This application claims priority to, and the benefit of, U.S. Provisional Patent Application Ser. No. 63/264,826, filed Dec. 2, 2021, the disclosure of which is hereby incorporated, by reference, in its entirety.

BACKGROUND OF THE INVENTION

1. Field of the Invention

Embodiments generally relate to systems and methods for one-click payments.

2. Description of the Related Art

Currently, many news creators/outlets have paywalls that require a monthly subscription. This unfortunately turns away a significant number of visitors to these news sites because they only want to consume/read a single article. There is, however, no payment method that is efficient enough and cost effective enough to charge very small amounts (e.g., $1 or below) for a single piece of content.

SUMMARY OF THE INVENTION

Systems and methods for one-click payments are disclosed. In one embodiment, a method for one-click payments may include: (1) receiving, at a backend for a financial institution and from a user electronic device, enrollment of a user in a payments process comprising an identification of a user account with the financial institution; (2) generating, by the backend, a token comprising an identification of an Application Programming Interface (API) exposed to the backend and a user identifier; (3) communicating, by the backend, the token to the user electronic device, wherein the user electronic device is configured to store the token in secure storage on the user electronic device or in a browser; (4) receiving, by the backend and from an electronic device for a content provider, enrollment of the content provider in the payments process comprising an identification of a content provider account with the financial institution; (5) receiving, by the backend and at the API, an identifier for the content provider, a cost for content provided by the content provider, and the user identifier; (6) identifying, by the backend, the user account using the user identifier; (7) transferring, by the backend, the cost from the user account to the content provider account; and (8) notifying, by the backend, the content provider of completion of the transfer, wherein the content provider is configured to make the content available to the user electronic device after completion of the transfer.

In one embodiment, the content may include news content, image content, book content, information content, applications, games, etc. In another embodiment, the content may include a service comprising access to WiFi or access to a wireless phone network.

In one embodiment, the cost may be for a micropayment.

In one embodiment, the user identifier may include an identifier for the user, an identifier for the electronic device, or an identifier for the user account.

In one embodiment, the user electronic device may be configured to access the content by downloading the content or downloading an access code to access the content.

In one embodiment, the method may also include disabling, by the backend, the token stored on the user electronic device.

According to another embodiment, a method for one-click payments may include: receiving, at a backend for a first financial institution and from a user electronic device, enrollment of a user in a payments process comprising an identification of a user account with the first financial institution; (2) generating, by the backend for the first financial institution, a token comprising an identification of an Application Programming Interface (API) exposed to the backend and a user identifier; (3) communicating, by the backend for the first financial institution, the token to the user electronic device, wherein the user electronic device is configured to store the token in secure storage on the user electronic device or in a browser; (4) establishing, by the backend for the first financial institution, an account for a second financial institution, wherein the second financial institution maintains an account for the first financial institution and an account for a content provider; (5) receiving, by the backend for the first financial institution and at the API, an identifier for the content provider, a cost for content provided by the content provider, and the user identifier; (6) identifying, by the backend for the first financial institution, the user account using the user identifier; (7) transferring, by the backend for the first financial institution, the cost from the user account to the account for the second financial institution; (8) notifying, by the backend for the first financial institution, the content provider of completion of the transfer, wherein the content provider is configured to make the content available to the user electronic device after the completion of transfer; and (9) settling, by the backend for the first financial institution and with the second financial institution, the account for the second financial institution with the account for the first financial institution.

In one embodiment, the content may include news content, image content, book content, information content, applications, games, etc. In another embodiment, the content may include a service comprising access to WiFi or access to a wireless phone network.

In one embodiment, the cost may be for a micropayment.

In one embodiment, the user identifier may include an identifier for the user, an identifier for the electronic device, or an identifier for the user account.

In one embodiment, the user electronic device may be configured to access the content by downloading the content or downloading an access code to access the content.

In one embodiment, the method may also include disabling, by the backend for the first financial institution, the token stored on the user electronic device.

In one embodiment, the backend for the first financial institution may settle with the second financial institution using an electronic funds transfer.

According to another embodiment, a non-transitory computer readable storage medium, including instructions stored thereon, which when read and executed by one or more computer processors, cause the one or more computer processors to perform steps comprising: receiving, from a user electronic device, enrollment of a user in a payments process comprising an identification of a user account with a financial institution; generating a token comprising an identification of an Application Programming Interface (API) exposed a backend for the financial institution and a user identifier; communicating the token to the user electronic device, wherein the user electronic device is configured to store the token; receiving, from an electronic device for a content provider, enrollment of the content provider in the payments process comprising an identification of a content provider account with the financial institution; receiving, at the API, an identifier for the content provider, a cost for content provided by the content provider, and the user identifier; identifying the user account using the user identifier; transferring the cost from the user account to the content provider account; and notifying the content provider of completion of the transfer, wherein the content provider is configured to make the content available to the user electronic device after the completion of the transfer.

In one embodiment, the content may include news content, image content, book content, information content, applications, games, etc. In another embodiment, the content may include a service comprising access to WiFi or access to a wireless phone network.

In one embodiment, the cost may be for a micropayment.

In one embodiment, the user identifier may include an identifier for the user, an identifier for the electronic device, or an identifier for the user account.

In one embodiment, the user electronic device may be configured to access the content by downloading the content or downloading an access code to access the content.

In one embodiment, the method may also include disabling, by the backend for the first financial institution, the token stored on the user electronic device.

In one embodiment, the non-transitory computer readable storage medium may also include instructions stored thereon, which when read and executed by one or more computer processors, cause the one or more computer processors to disable the token stored on the user electronic device.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
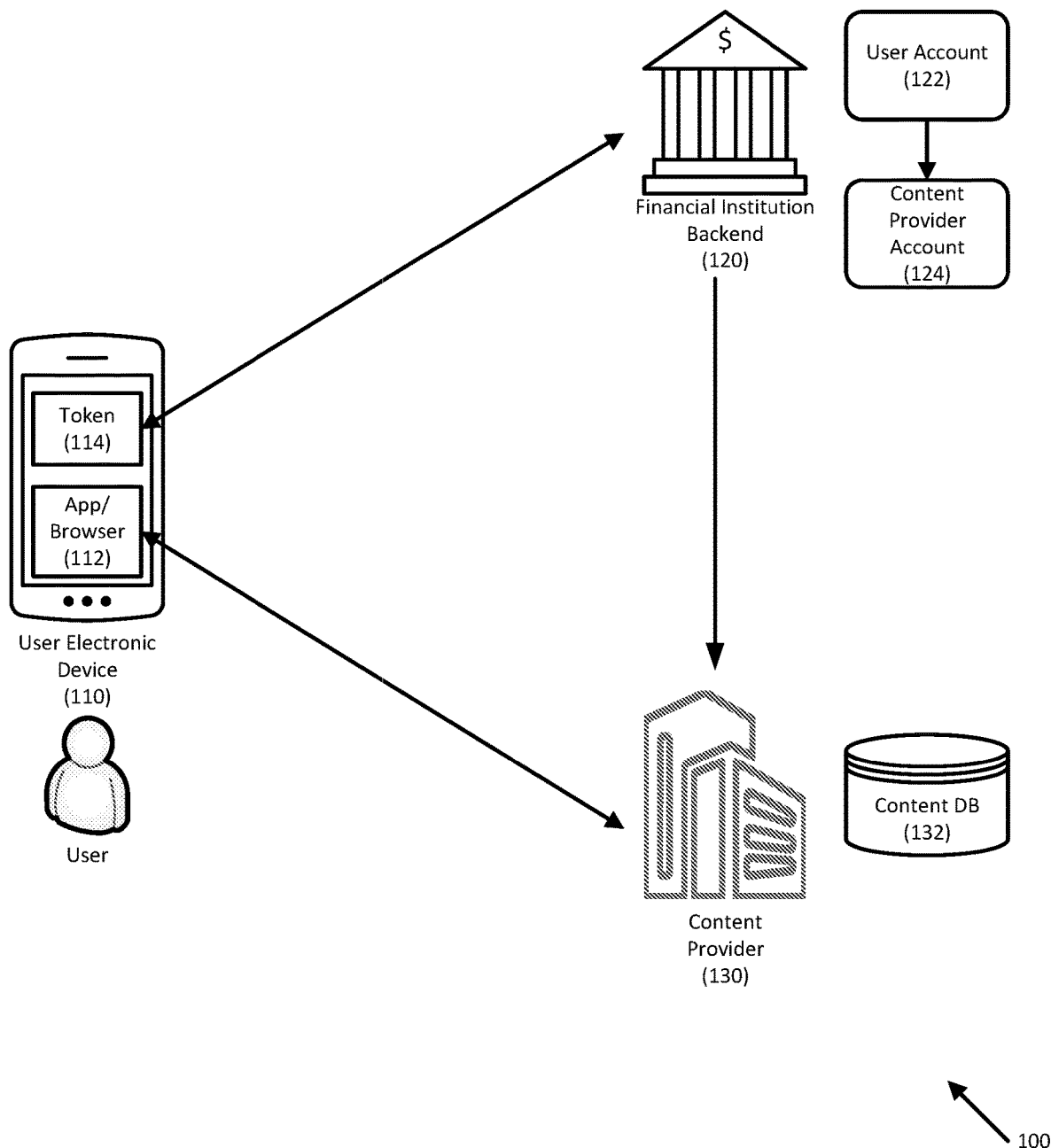
FIG. 1 depicts a system for one-click payments involving a single financial institution according to an embodiment.

Embodiments are directed to systems and methods for one-click payments. In embodiments, payments may be micropayments (e.g., sub $1 payments).

Embodiments enable payments in a manner that is cost effective and efficient. This type of payment approach allows various sellers/creators to charge very small fees rather than offering their services/content for free or requiring a "subscription." One example is access to a news creator's online or other content. Other examples include access to pay-as-you-go cellular minutes (e.g., international travel), access to Wi-Fi (e.g., when traveling, on a plane, etc.), access to vending machines, payment of gratuities, etc. Any sort of suitable payment may be facilitated.

Although embodiments may be described in the context of a content provider, this should be understood to include content providers, service providers, etc. And content should be understood to include content (e.g., news, images, books, information, apps, games, etc.) and/or services that may be accessed using the user's electronic device (e.g., WiFi access, wireless phone minutes, etc.).

In embodiments, payments may be made in any suitable fiat currency, cryptocurrencies, etc. In addition, payments may be made from digital wallets.

Embodiments may treat payments as intra-bank transfers. Such transfers may be instantaneous, may occur at any time, and are inexpensive. Embodiments may involve a single financial institution, or multiple financial institutions. With multiple financial institutions, the financial institutions may carry the equivalents of nostro accounts with each other to enable intra-bank money movement for each purchase and netting transactions from time to time.

In the single financial institution embodiment, a plug-in or similar mechanism may be accessed from the user's electronic device (e.g., computer, mobile device, Internet of Things (IoT) device, etc.). The user may log into a financial institution and may sign up for payments, such as micropayments. The user may also consent to notifications regarding any purchases.

In one embodiment, the user may access the financial institution login using a browser plugin on the user's electronic device.

The financial institution may then generate an encrypted "token" or similar that may be placed on the user's electronic device, stored in the browser on the electronic device, etc. that may be used to make API calls to a backend (e.g., servers and/or databases) for the financial institution.

For example, a content provider (e.g., XYZ News Co.) may also open or have an account with the financial institution, and may implement the capability of accepting payments (e.g., micropayments). For example, the content provider may include a single button or similar on the paywall.

When the user wants to read a story on the XYZ News Co. website and comes to the paywall, the user may see two options: (1) the option to subscribe to XYZ News Co., and (2) a single button that says pay with micropayments. If the user only wants to access that particular content, the user may select the pay with micropayments button.

In response, the token on the user's electronic device would send encrypted instructions to the financial institution to pay XYZ News Co. for that article. The instructions would also include the name of XYZ News Co. Other information, such as the article name, billing information, etc. may be included as desired. The financial institution may then debit the user's account with the financial institution, and credit XYZ News Co's account. No further log-in may be required for the user.

The financial institution may then inform the content provider (e.g., XYZ News Co.) that payment has been made and the content provider may make the content available to the user.

The financial institution may then push a notification (e.g., via SMS, through the financial institution's mobile application, by email, etc.) to inform the user that the user purchased one article from XYZ News Co. If the user responds that the user did not purchase that article, the financial institution may disable the token on the user's electronic device and may reimburse the payments. In one embodiment, the financial institution may assume the risk of such payments.

In the multi-financial institution scenario, the user may have an account with a first financial institution, and the content provider may have an account with a second financial institution. The financial institutions hold accounts with each other to enable gross transactions at the same speed and efficiency. The payments may be made by netting. The risk would be taken by the financial institution whose 'token' is installed on the user's electronic device.

FIG. 1 depicts a system for one-click payments involving a single financial institution according to an embodiment. System 100 may include user electronic device 110, which may be any suitable electronic device including computers (e.g., workstations, desktops, laptops, tablets, etc.), smart devices (e.g., smart phones, smart watches, etc.), Internet of Things (IoT) appliances, etc. User electronic device 110 may be accessed by and/or associated with a user. User electronic device 110 may execute application or browser 112 that may interface with content provider 130. Content provider 130 may be any suitable provider of content or services that may be purchased with a small payment, such as a micropayment. Examples include news, images, books, services, information, apps, games, WiFi access, wireless phone minutes, etc.

In one embodiment, content provider 130 may store content in content database 132. Content provider 130 may also provide access to services (e.g., WiFi, wireless phone minutes, etc.) in a network (not shown).

Financial institution backend 120 may be a backend for a financial institution, such as a bank, a financial technology prover (FinTech), etc. Financial institution backend 120 may maintain one or more customer accounts, such as user account 122 for the user and content provider account 124 for content provider 130.

Financial institution backend 120 may execute a financial institution computer program (not shown) to generate token 114 for the user and may provide token 114 to user electronic device 110. Token 114 may be stored on user electronic device 110 in, for example, memory, secure storage, in application or browser 112, etc.

Financial institution backend 120 may also execute a financial institution computer program (not shown) to transfer a payment from user account 122 to content provider account 124. The payment may be made in fiat currency, cryptocurrency, reward points, etc.

In one embodiment, user account 122 and content provider account 124 may be digital wallets that may be maintained on a distributed ledger (not shown).

Figure 2:
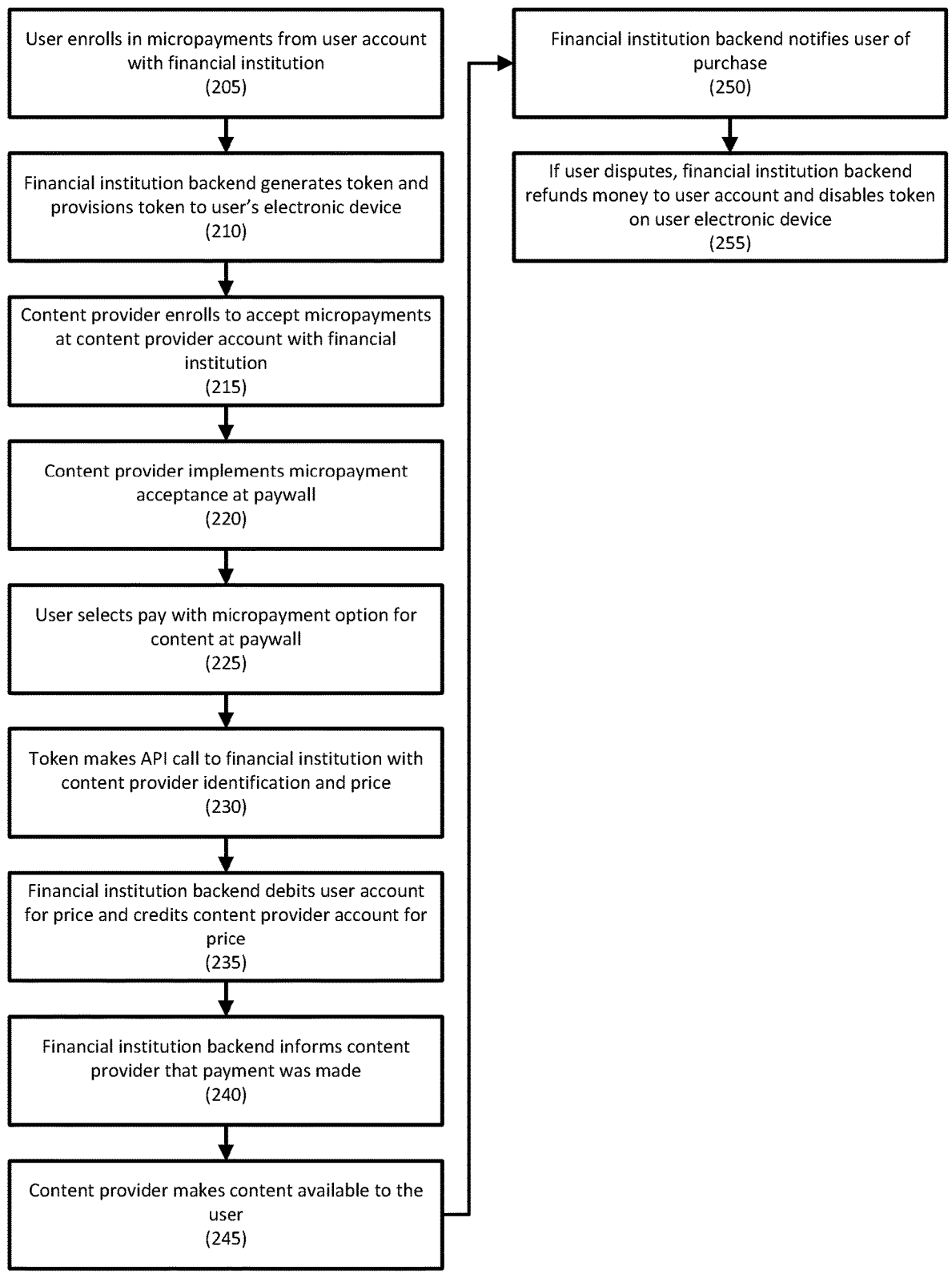
FIG. 2 depicts a method for one-click payments involving a single financial institution according to an embodiment.

FIG. 2 depicts a method for one-click payments involving a single financial institution according to an embodiment.

In step 205, a user may enroll in payments from a user account with a financial institution. The user may enroll using an application or browser executed by a user electronic device. The payments may be for micropayments (e.g., payments under $1).

In one embodiment, the user may identify a user account to serve as a source of funds for the payments. In one embodiment, the user may also set restrictions on the payments, such as dollar limits, time limits, geographical scope limits, etc. to reduce a likelihood of fraud.

In step 210, a financial institution backend for the financial institution may generate a token or similar, and may provision the token to the user electronic device. In one embodiment, the token may identify an API exposed by the financial institution backend for making a payment. The token may also identify a user, the user account, and/or the electronic device.

In step 215, a content provider may enroll with the financial institution to accept payments at a content provider account with the financial institution. The content provider may provide any suitable content (e.g., news, images, books, information, apps, games, etc.) and/or services (e.g., WiFi access, wireless phone minutes, etc.).

In one embodiment, the content provider may identify an account with the financial institution for receiving payment.

In step 220, the content provider may implement payment acceptance at its paywall. For example, the content provider may implement a payment button such as "Pay with Micropayments" at its paywall.

In step 225, after identifying content or a service to purchase, a user may select the payment button at the content provider's paywall.

In step 230, the selection of the payment button causes the electronic device to access the token and to make an API call to the financial institution backend using the API identified in the token. The API call may include an identifier for the content provider and a cost of the content. It may further include a user identifier, such as an identifier for the user, the user account, and/or the electronic device.

In step 235, the financial institution backend may debit the user account for the cost of the content and may credit the content provider account for cost of the content. The financial institution backend may identify the user account within information received in the API call.

In step 240, the financial institution backend may inform the content provider that payment was made from the user account to the content provider account, and in step 245, the content provider may make the content, service, etc. available to the user. For example, the user may download the content, may receive a password, access code, etc. to access a service, etc.

In step 250, the financial institution backend may separately notify the user of the purchase. For example, the financial institution may send an in-app message, a text, an email, a voice message, etc.

In step 255, if the user disputes the payment, the financial institution backend may refund the payment to the user account. It may also disable the token on the user electronic device by adding it to a do not use list or similar.

Figure 3:
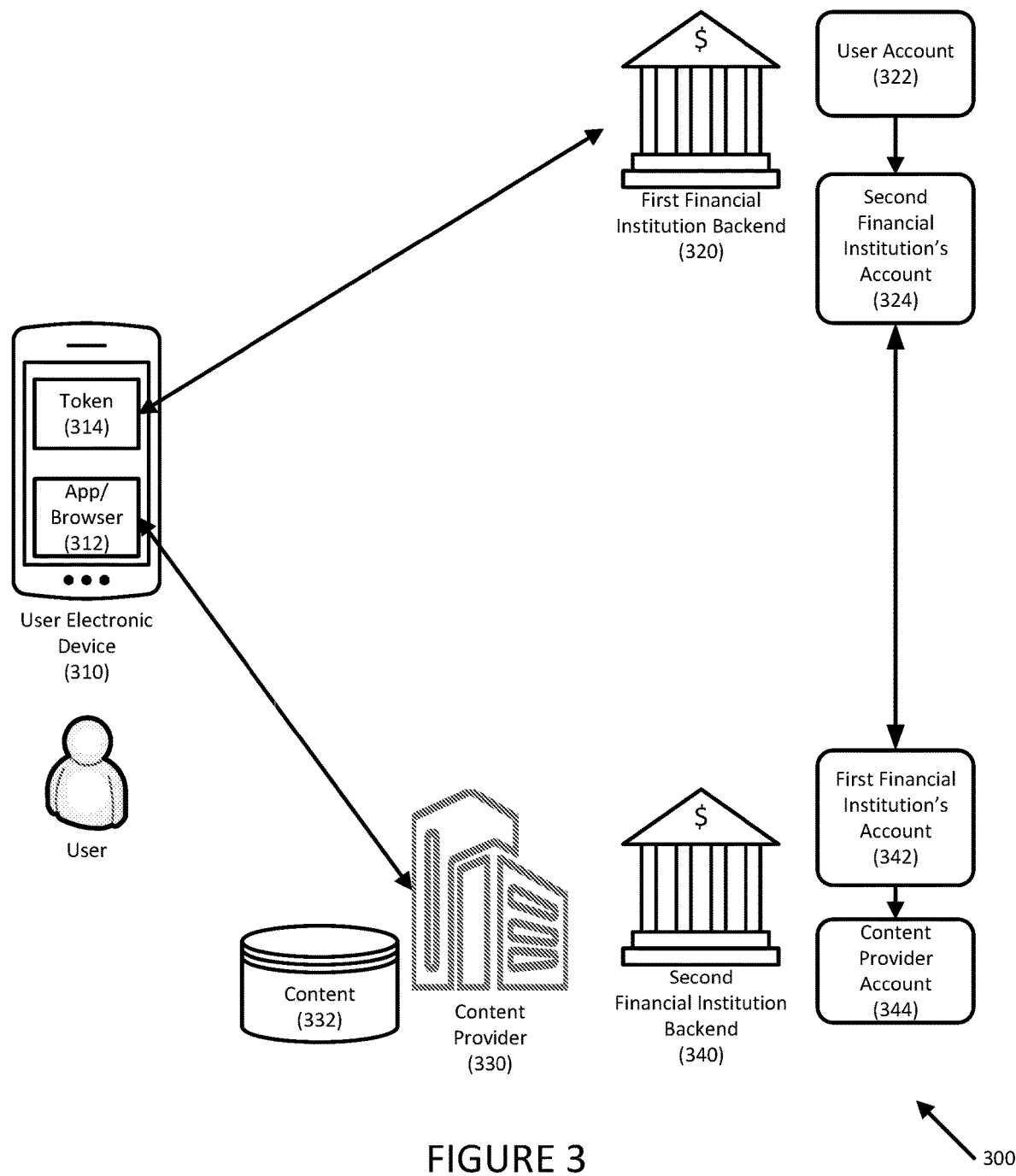
FIG. 3 depicts a system for one-click payments involving multiple financial institutions according to another embodiment.

FIG. 3 depicts a system for one-click payments involving multiple financial institutions according to another embodiment. System 300 may include user electronic device 310, which may be similar to user electronic device 110, described above. User electronic device 310 may execute application or browser 312 that may interface with content provider 330. It may further store token 314, which may be similar to toke 114, in memory of electronic device 310, in application or browser 312, etc.

Content provider 330 may be similar to content provider 130, described above. Content provider 330 may store content in content database 332, which may be similar to content database 132.

First financial institution backend 320 may be a backend for a first financial institution, such as a bank, a financial technology prover (FinTech), etc., with which the user may have an account, such as user account 322. First financial institution backend 320 may also maintain second financial institution's account 324 for a second financial institution associated with second financial institution backend 340.

Second financial institution backend 320 may be a backend for a financial institution, such as a bank, a financial technology prover (FinTech), etc., with which the content provider may have an account, such as content provider account 344. Second financial institution backend 320 may also maintain first financial institution's account 344 for the first financial institution.

First financial institution backend 320 may execute a first financial institution computer program (not shown) to generate token 334 for the user and may provide token 334 to user electronic device 310. Token 334 may be stored on user electronic device 330 in, for example, memory, secure storage, in application or browser 312, etc.

First financial institution backend 320 may also execute a first financial institution computer program (not shown) to transfer a payment from user account 322 to second financial institution's account 324. The payment may be made in fiat currency, cryptocurrency, reward points, etc.

Upon settlement, first financial institution backend 320 may transfer funds to first financial institution's account 344 via, for example, an electronic funds transfer using the Automated Clearing House (ACH).

Second financial institution backend 340 may execute a second financial institution computer program (not shown) to transfer a payment from first financial institution's account 342 to content provider account 344. The payment may be made in fiat currency, cryptocurrency, reward points, etc.

In one embodiment, accounts 322, 324, 342, and/or 344 may be digital wallets that may be maintained on a distributed ledger (not shown).

Figure 4:
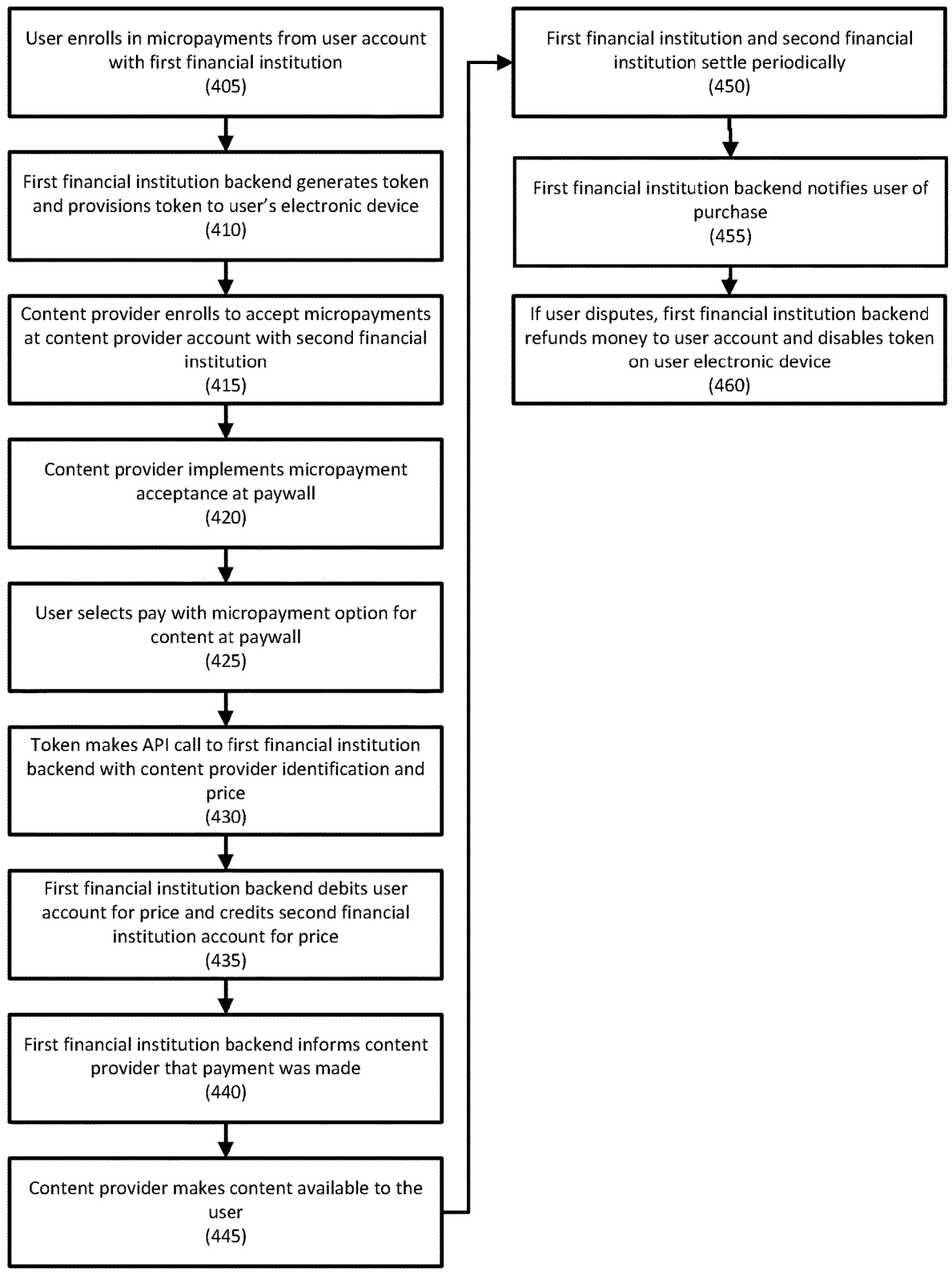
FIG. 4 depicts a method for one-click payments involving multiple financial institutions according to another embodiment.

FIG. 4 depicts a method for one-click payments involving multiple financial institutions according to another embodiment.

In step 405, a user may enroll in payments from a user account with first financial institution, such as the user's financial institution. The user may enroll using an application or browser executed by a user electronic device. The payments may be for micropayments.

In one embodiment, the user may identify a user account to serve as a source of funds for the payments. In one embodiment, the user may also set restrictions on the payments, such as dollar limits, time limits, geographical scope limits, etc. to reduce a likelihood of fraud.

In step 410, a first financial institution backend for the first financial institution may generate a token or similar, and may provision the token to the user electronic device. In one embodiment, the token may identify an API exposed by the first financial institution backend for making a payment. The token may also identify a user, the user account, and/or the electronic device.

In step 415, a content provider may enroll with a second financial institution, such as the content provider's financial institution, to accept payments. The content provider may provide any suitable content (e.g., news, images, books, information, apps, games, etc.) and/or services (e.g., WiFi access, wireless phone minutes, etc.).

In one embodiment, the content provider may identify an account with the second financial institution for receiving payment.

In one embodiment, the first financial institution may maintain an account for the second financial institution, and the second financial institution may maintain an account for the first financial institution. These accounts may be similar to nostro accounts, but they may all be in the same fiat currency.

In step 420, the content provider may implement payment acceptance at its paywall. For example, the content provider may implement a payment button such as "Pay with Micropayments" at its paywall.

In step 425, after identifying content or a service to purchase, a user may select the payment button at the content provider's paywall.

In step 430, the selection of the payment button causes the electronic device to access the token and to make an API call to the first financial institution backend using the API identified in the token. The API call may include an identifier for the content provider and a cost of the content. It may further include a user identifier, such as an identifier for the user, the user account, and/or the electronic device.

In step 435, the first financial institution backend may debit the user account for the cost, and may credit the second financial institution's account for the cost.

In step 440, the first financial institution may inform the content provider that payment was made, and in step 445, the content provider may make the content or service available to the user. For example, the user may download the content, may receive a password, access code, etc. to access a service, etc.

In step 450, the first financial institution and second financial institution may settle their accounts periodically. This may be done at any desired frequency.

In step 455, the first financial institution backend may separately notify the user of the purchase. For example, the first financial institution may send an in-app message, a text, an email, a voice message, etc.

In step 460, if the user disputes the payment, the first financial institution backend may refund the payment to the user account. It may also disable the token on the user electronic device by adding it to a do not use list or similar.

In embodiments, the user may request a token for a second user and have that token provisioned to the second user's electronic device. For example, a parent may have a token provisioned to a child's electronic device, one user may gift a token to another user, etc. The token may be associated with the first user's account, and the first user may include any restrictions (e.g., restrictions on amount, number of uses, content providers/service providers, etc.).

In one embodiment, a token may be shared from one electronic device to another via, for example, a digital wallet. In another embodiment, the token may be device-specific and may not be transferred. For example, the token may include an encrypted identifier for the electronic device, and that electronic identifier may be validated against the electronic device identifier before payment may be completed. The encrypted identifier may be included in the API call to the financial institution, and the financial institution may validate the device identifier before executing payment.

Figure 5:
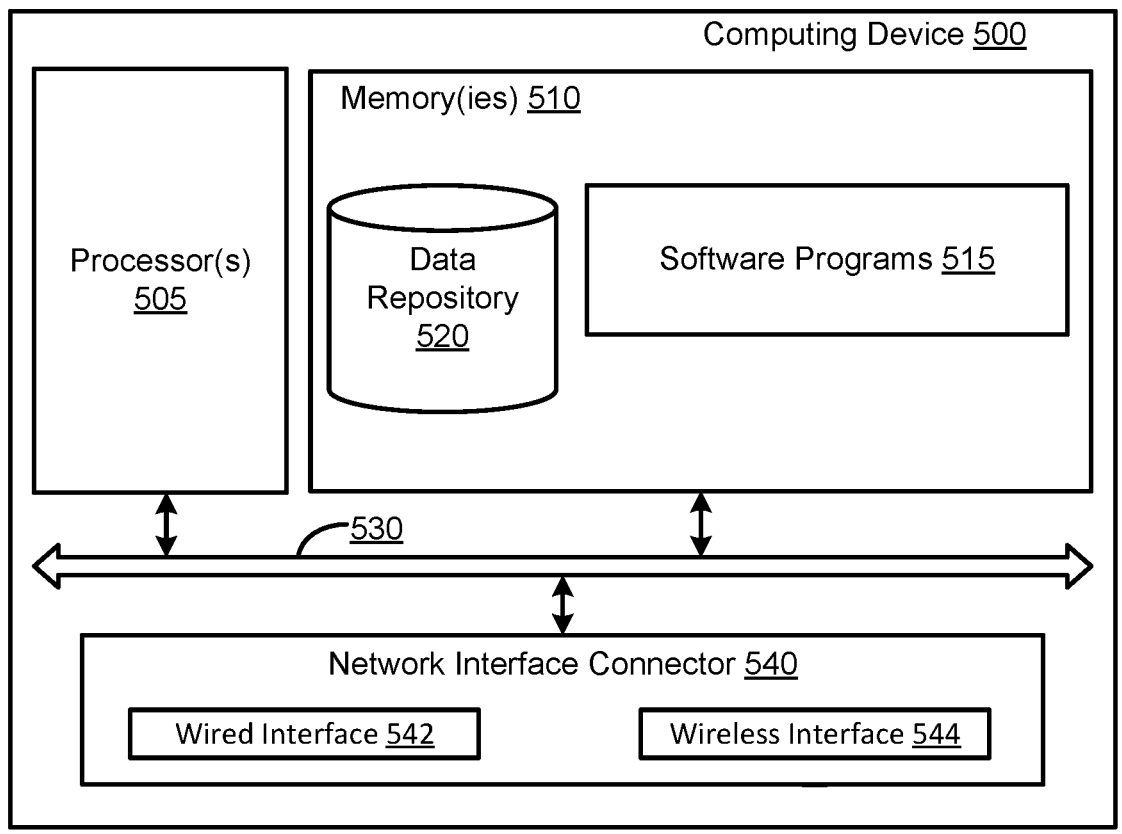
FIG. 5 depicts an exemplary computing system for implementing aspects of the present disclosure.

FIG. 5 depicts an exemplary computing system for implementing aspects of the present disclosure. FIG. 5 depicts exemplary computing device 500. Computing device 500 may represent the system components described herein. Computing device 500 may include processor 505 that may be coupled to memory 510. Memory 510 may include volatile memory. Processor 505 may execute computer-executable program code stored in memory 510, such as software programs 515. Software programs 515 may include one or more of the logical steps disclosed herein as a programmatic instruction, which may be executed by processor 505. Memory 510 may also include data repository 520, which may be nonvolatile memory for data persistence. Processor 505 and memory 510 may be coupled by bus 530. Bus 530 may also be coupled to one or more network interface connectors 540, such as wired network interface 542 or wireless network interface 544. Computing device 500 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
receiving, at a backend for a financial institution and from a user electronic device, enrollment of a user in a payments process comprising an identification of a user account with the financial institution and a time restriction on payments from the user account;
generating, by the backend, a token comprising an identification of an Application Programming Interface (API) exposed to the backend and an identifier for the user account;
communicating, by the backend, the token to the user electronic device, wherein the user electronic device is configured to store the token in secure storage on the user electronic device or in a browser;
receiving, by the backend and from an electronic device for a content provider, enrollment of the content provider in the payments process comprising an identification of a content provider account with the financial institution;
receiving, by the backend and at the API, a payment request comprising an identifier for the content provider, a cost for content provided by the content provider, and the identifier for the user account, wherein the API is called by user electronic device using the token;
transferring, by the backend, the cost from the user account to the content provider account associated with the identifier of the content provider in response to the payment request being received within the time restriction;
notifying, by the backend, the content provider of completion of the transfer; and
making available, by the content provider, the content available to the user electronic device after completion of the transfer.

2. The method of claim 1, wherein the content comprises news content, image content, book content, information content, applications, games, etc.

3. The method of claim 1, wherein the content comprises a service comprising access to WiFi or access to a wireless phone network.

4. The method of claim 1, wherein the cost is a micropayment.

5. The method of claim 1, wherein the user electronic device is configured to access the content by downloading the content or downloading an access code to access the content.

6. The method of claim 1, further comprising:
disabling, by the backend, the token stored on the user electronic device.

7. A method, comprising:
receiving, at a backend for a first financial institution and from a user electronic device, enrollment of a user in a payments process comprising an identification of a user account with the first financial institution and a time restriction on payments from the user account;

generating, by the backend for the first financial institution, a token comprising an identification of an Application Programming Interface (API) exposed to the backend and an identifier for the user account;

communicating, by the backend for the first financial institution, the token to the user electronic device, wherein the user electronic device is configured to store the token in secure storage on the user electronic device or in a browser;

establishing, by the backend for the first financial institution, an account for a second financial institution, wherein the second financial institution maintains an account for the first financial institution and an account for a content provider;

receiving, by the backend and at the API, a payment request comprising an identifier for the content provider, a cost for content provided by the content provider, and the identifier for the user account, wherein the API is called by user electronic device using the token;

transferring, by the backend for the first financial institution, the cost from the user account to the account for the second financial institution associated with the identifier of the second financial institution in response to the payment request being received within the time restriction;

notifying, by the backend for the first financial institution, the content provider of completion of the transfer;

making available, by the content provider the content available to the user electronic device after the completion of transfer; and settling, by the backend for the first financial institution and with the second financial institution, the account for the second financial institution with the account for the first financial institution.

8. The method of claim 7, wherein the content comprises news content, image content, book content, information content, applications, games, etc.

9. The method of claim 7, wherein the content comprises a service comprising access to WiFi or access to a wireless phone network.

10. The method of claim 7, wherein the cost is a micropayment.

11. The method of claim 7, wherein the user electronic device is configured to access the content by downloading the content or downloading an access code to access the content.

12. The method of claim 7, further comprising:
disabling, by the backend for the first financial institution, the token stored on the user electronic device.

13. The method of claim 7, wherein the backend for the first financial institution settles with the second financial institution using an electronic funds transfer.

14. A non-transitory computer readable storage medium, including instructions stored thereon, which when read and executed by one or more computer processors, cause the one or more computer processors to perform steps comprising:

receiving, from a user electronic device, enrollment of a user in a payments process comprising an identification of a user account with a financial institution and a time restriction on payments from the user account;

generating a token comprising an identification of an Application Programming Interface (API) exposed a backend for the financial institution and an identifier for the user account;

communicating the token to the user electronic device, wherein the user electronic device is configured to store the token;

receiving, from an electronic device for a content provider, enrollment of the content provider in the payments process comprising an identification of a content provider account with the financial institution;

receiving, by the backend and at the API, a payment request comprising an identifier for the content provider, a cost for content provided by the content provider, and the identifier for the user account, wherein the API is called by user electronic device using the token;

transferring, the cost from the user account to the content provider account associated with the identifier of the content provider in response to the payment request being received within the time specified by the time restriction;

notifying the content provider of completion of the transfer; and making available, by the content provider, the content available to the user electronic device after the completion of the transfer.

15. The non-transitory computer readable storage medium of claim 14, wherein the content comprises news content, image content, book content, information content, applications, games, etc.

16. The non-transitory computer readable storage medium of claim 14, wherein the content comprises a service comprising access to WiFi or access to a wireless phone network.

17. The non-transitory computer readable storage medium of claim 14, further including instructions stored thereon, which when read and executed by one or more computer processors, cause the one or more computer processors to disable the token stored on the user electronic device.

* * * * *